(12) United States Patent
Shimizu et al.

(10) Patent No.: US 7,718,307 B2
(45) Date of Patent: May 18, 2010

(54) NEGATIVE ELECTRODE MATERIAL FOR NONACQUEOUS ELECTROLYTE SECONDARY BATTERY OF HIGH INPUT/OUTPUT CURRENT, METHOD FOR PRODUCING THE SAME AND BATTERY EMPLOYING NEGATIVE ELECTRODE MATERIAL

(75) Inventors: Kazuhiko Shimizu, Fukushima-Ken (JP); Mariko Maeda, Fukushima-Ken (JP); Syuji Morinishi, Fukushima-Ken (JP); Aisaku Nagai, Tokyo (JP); Akiko Hoshi, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 746 days.

(21) Appl. No.: 11/547,645

(22) PCT Filed: Mar. 29, 2005

(86) PCT No.: PCT/JP2005/005908

§ 371 (c)(1),
(2), (4) Date: Oct. 5, 2006

(87) PCT Pub. No.: WO2005/098999

PCT Pub. Date: Oct. 20, 2005

(65) Prior Publication Data

US 2007/0287068 A1 Dec. 13, 2007

(30) Foreign Application Priority Data

Apr. 5, 2004 (JP) .............................. 2004-111234

(51) Int. Cl.
*H01M 2/00* (2006.01)

(52) U.S. Cl. .................... 429/61; 429/231.8; 429/213; 429/212; 429/60; 429/332; 423/448; 423/445 R; 423/449.1

(58) Field of Classification Search .................... None
See application file for complete search history.

(56) References Cited

U.S. PATENT DOCUMENTS 5,451,477 A * 9/1995 Omaru et al. ............... 429/326

(Continued)

FOREIGN PATENT DOCUMENTS

EP 0700105 A2 3/1996

(Continued)

OTHER PUBLICATIONS

Supplementary European Search Report issued in European Application corresponding to International (PCT) Application No. PCT/JP2005/005908.

*Primary Examiner*—Melvin C Mayes
*Assistant Examiner*—Smita Patel
(74) *Attorney, Agent, or Firm*—Wenderoth, Lind & Ponack, L.L.P.

(57) ABSTRACT

A negative electrode material for a high input/output currant-type non-aqueous electrolyte secondary battery, comprising a carbon material having an average (002) interlayer spacing $d_{002}$ of 0.355-0.400 nm determined by X-ray diffractometry and a true density of 1.50-1.60 g/cm³, and exhibiting a capacity (A) of at least 50 mAh/g in a battery voltage range of 0.3-1.0 V and a ratio ((A)/(B)) of at least 0.3 between the capacity (A) and a capacity (B) in a battery voltage range of 0-1.0 V when measured as discharge capacities with a counter electrode of lithium. The negative electrode material is non-graphitizable and has properties suitable for a negative electrode material for high input/output current non-aqueous electrolyte secondary batteries as used in HEV, etc.

9 Claims, 3 Drawing Sheets

U.S. PATENT DOCUMENTS

| | | |
|---|---|---|
| 5,716,732 A | 2/1998 | Imoto et al. |
| 5,772,974 A * | 6/1998 | Ohashi et al. ............ 423/447.7 |
| 2002/0018926 A1 * | 2/2002 | Shiga et al. ................... 429/61 |
| 2002/0081485 A1 | 6/2002 | Takekawa et al. |
| 2003/0118908 A1 * | 6/2003 | Ishikawa et al. ......... 429/231.8 |

FOREIGN PATENT DOCUMENTS

| | | |
|---|---|---|
| EP | 0726606 A1 | 8/1996 |
| JP | 6-089721 | 3/1994 |
| JP | 9-161801 | 6/1997 |
| JP | 2003-168427 | 6/2003 |

* cited by examiner

NEGATIVE ELECTRODE MATERIAL FOR NONACQUEOUS ELECTROLYTE SECONDARY BATTERY OF HIGH INPUT/OUTPUT CURRENT, METHOD FOR PRODUCING THE SAME AND BATTERY EMPLOYING NEGATIVE ELECTRODE MATERIAL

TECHNICAL FIELD

The present invention relates to a non-aqueous secondary battery, and more particularly to a carbon material suitable as a negative electrode material for secondary battery characterized by small-size, lightness and a high output density; a process for production thereof; and a non-aqueous electrolyte secondary battery using the carbon material.

BACKGROUND ART

As a type of high-energy density secondary battery, there has been proposed a non-aqueous electrolyte-type lithium secondary battery using a carbon material as a negative electrode (e.g., Patent documents 1-4 listed below). The battery utilizes a phenomenon that a carbon intercalation compound of lithium can be easily formed electrochemically, and when the battery is charged, lithium in the positive electrode comprising, e.g., a chalcogenide compound such as $LiCoO_2$, is electrochemically inserted between carbon layers in the negative electrode (doping). The carbon thus doped with lithium functions as a lithium electrode to cause a discharge, whereby the lithium is liberated (dedoped) from the carbon layers to return to the positive electrode. Such a non-aqueous electrolyte secondary battery is small-sized and light in weight to have a high energy density, and accordingly demands therefor have increased as power supplies for portable appliances.

As negative electrode materials for such non-aqueous electrolyte secondary batteries for portable appliances, there has been also widely used non-graphitizable carbon having a potential capacity well exceeding a theoretical value of 372 mAh/g of graphite in terms of discharge capacity per 1 g of carbon, and in order to increase the discharge capacity thereof, several measures have been taken such as to effect a calcination while positively flowing an inert gas (Patent document 5 below) or under a reduced pressure (Patent document 6) so as to positively remove gas generated during carbonization reaction, thereby accelerating the growth of pores. However, the thus-formed non-graphitizable carbon is accompanied with a problem that it is oxidized when left in the atmosphere to result in an increase of irreversible capacity and a lowering in cycle characteristic. For solving the problem, there has been proposed a method of storing non-graphitizable carbon in an inert gas atmosphere (Patent document 7 below). Further, as another means for suppressing the degradation, there has been also proposed a method of depositing pyrolyzed carbon in the carbon surface to adjust the pore diameter (Patent document 8 below).

As a new use taking advantage of the characteristic of small-size and lightness of the non-aqueous electrolyte secondary battery, the development of batteries for electric cars or vehicles, such as electric cars (EV) driven by only motors and hybrid-type electric cars (HEV) combining an internal combustion engine and batteries, has been extensively made, and particularly HEV combining an engine and a battery-driven motor has been put before footlights as a motor car satisfying economy and low fuel consumption. Particularly, since the appearance as a commercially available car, an HEV has been increasing its markets because its concept of amenity to environments. For this type of cars, there has been demanded a weight reduction of batteries and an improvement in battery performances represented by input and output densities that directly lead to an improvement in fuel consumption, and a part of non-aqueous electrolyte secondary batteries have been commercialized for car use.

An HEV car is driven by increasing the load of a motor having a better drive efficiency than an internal combustion engine in a drive or running mode of a low velocity or a low load and driven by principally using the engine having a better drive efficacy than the motor in a drive mode of a high speed or a high load, such as quick start or passing at a high speed. Further, at the time of braking, the motor is used as a dynamo to recover a regenerated current and store it in the battery. Accordingly, the motor is principally used at the time of start, acceleration and speed reduction, and the battery for supplying an electric power to the motor is required to exhibit not a high energy density for supplying a small power for long hours but high input and output performances required for repetition of supply and receipt of large powers in a short time.

Thus, a secondary battery for HEV is required to show performances which are different from those of conventional secondary batteries for small-size portable appliances. However, the studies hitherto made for negative electrode materials for non-aqueous electrolyte secondary batteries have been almost exclusively directed to improved performances for negative electrode materials for secondary batteries as power supplies for small-size portable appliances. As a result, it is a present state that a negative electrode material having sufficient properties suitable for non-aqueous electrolyte secondary batteries of high input and output currents as represented by secondary batteries for HEV has not been developed.

Patent document 1: JP-A 57-208079
Patent document 2: JP-A 62-90863
Patent document 3: JP-A 62-122066
Patent document 4: JP-A 2-66856
Patent document 5: JP-B 3399015
Patent document 6: JP-B 3427577
Patent document 7: JP-A 8-298111
Patent document 8: JP-A 2003-323891

DISCLOSURE OF INVENTION

Accordingly, a principal object of the present invention is to provide a negative electrode material having characteristics suitable for use in a high input/output current-type non-aqueous electrolyte secondary battery as represented by a non-aqueous electrolyte secondary battery for HEVs.

A more specific object of the present invention is to provide a negative electrode material for a non-aqueous electrolyte secondary battery satisfying (1) input and output characteristics at large currents, and also (2) durability at high temperatures and (3) price competitiveness, in combination, as required properties thereof.

Thus, according to the present invention, there is provided a negative electrode material for a high input/output currant-type non-aqueous electrolyte secondary battery, comprising a carbon material having an average (002) interlayer sparing $d_{002}$ of 0.355-0.400 nm determined by X-ray diffractometry and a true density of 1.50-1.60 g/cm$^3$, and exhibiting a capacity (A) of at least 50 mAh/g in a battery voltage range of 0.3-1.0 V and a ratio ((A)/(B)) of at least 0.3 between the capacity (A) and a capacity (B) in a battery voltage range of 0-1.0 V when measured as discharge capacities with a counter electrode of lithium.

Among the above-prescribed features of the negative electrode material of the present invention, the former one of "comprising a carbon material having an average (002) interlayer spacing $d_{002}$ of 0.355-0.400 nm determined by X-ray diffractometry and a true density of 1.50-1.60 g/cm$^3$" means that the negative electrode material comprises a non-graphitizable carbon (hard carbon), and the latter one of "exhibiting a capacity (A) of at least 50 mAh/g in a battery voltage range of 0.3-1.0 V and a ratio ((A)/(B)) of at least 0.3 between the capacity (A) and a capacity (B) in a battery voltage range of 0-1.0 V when measured as discharge capacities with a counter electrode of lithium" is a property suited for a high input/output current-type non-aqueous electrolyte secondary battery achieved by the present invention.

Hereinbelow, some history through which the present inventors have arrived at the present invention as a result of study with the above-mentioned object will be briefly described.

Figure 1:
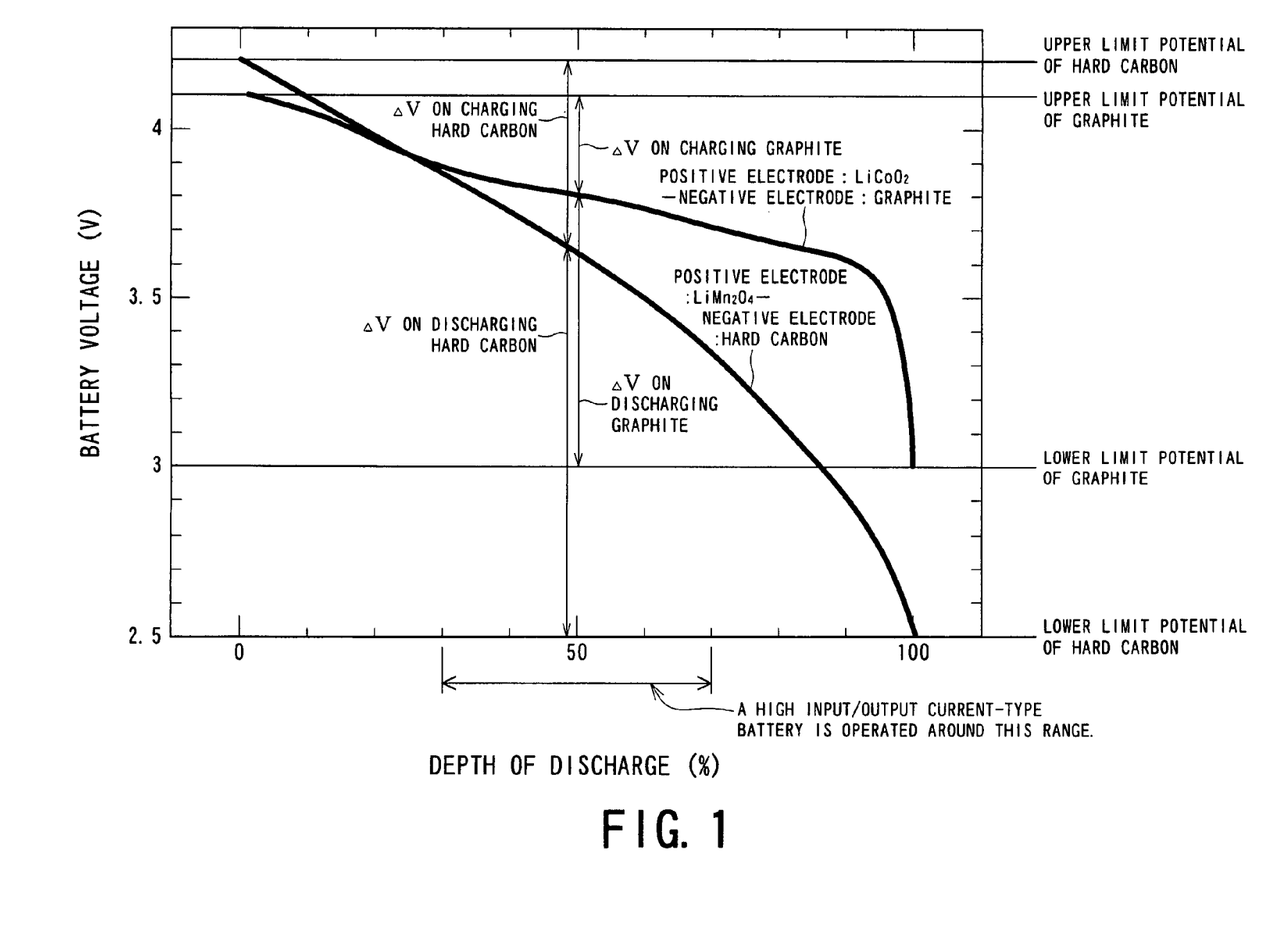
FIG. 1 shows discharge curves of batteries comprising a combination of positive electrode: $LiCoO_2$-negative electrode: graphite and a combination of positive electrode: $LiMn_2O_4$-negative electrode: hard carbon, respectively.

Among the above-mentioned properties (1)-(3) required of a high input/output current-type non-aqueous electrolyte secondary battery, in order to satisfy the property (1), it is necessary to vary the potential change behavior at the time of charging and discharging. In a non-aqueous electrolyte-type lithium secondary battery, the form of potential change corresponding to capacity change can be varied by a combination of positive electrode and negative electrode. FIG. 1 shows discharge curves for a combination of positive electrode: LiCoO$_2$-negative electrode: graphite, and a combination of positive electrode: LiMn$_2$O$_4$-negative electrode: non-graphitizable carbon (hard carbon), respectively, and shows battery voltage change on the ordinate corresponding to depth of discharge on the abscissa. Generally, a battery for small-size portable appliances is operated in such a manner that it is discharged at a small current from a full charge potential to a lower limit potential and repetitively discharged after full charge. For such a use, a battery retaining as high a potential as possible in a discharge state and showing a small potential change versus a capacity change is suitable, so that LiCoO$_2$ and graphite are used for the positive electrode and negative electrode, respectively, as active substances showing small potential changes in response to the capacity change.

Compared with an open terminal voltage, actual voltages are shifted to a higher potential at the time of charging and to a lower potential at the time of discharging. The resultant potential difference ΔV is denoted by ΔV=I×R, wherein I represents a current and R represents an internal resistance of a battery. At the time of charging at a large current, I is increased so that the reduction of internal resistance is used as a means for improving the performances at a large current of a battery, and many methods have been proposed therefor.

With respect to an open terminal voltage, ΔV is shifted to a higher potential at the time of charging and to a lower potential at the time of discharging, whereas the absolute value of ΔV is denoted by a difference of an upper limit potential at the time of charging or a difference of a lower limit at the time of discharging, respectively, with the open terminal voltage. In case where the internal resistance is constant, a larger ΔV allows a use under a larger current.

As for selection of positive electrodes, in case where LiCoO$_2$ is used for small-size portable appliances or LiMn$_2$O$_4$ is used in secondary batteries for HEV as used frequently in view of safety, load characteristic and cost competition ability, respectively, if graphite is used as a negative electrode, the battery is always retained at a high potential over the capacity, the resultant ΔV as a difference between the upper limit potential and the open terminal voltage becomes small, thus leading to an essential problem that the current cannot be accepted sufficiently, particularly at the time of receiving a regeneration current, i.e., in charging at large currents.

Further, also regarding the manner of using a battery, a battery is used by repetition of charging and discharging at large currents different from the use as in a small-size portable appliance repeating full charge and complete discharge. In such a use, it is preferred to adopt a manner of use such that the input and output are repeated in a region where the input characteristic and the output characteristic are balanced with each other, i.e., while keeping the battery in a charge level region of around 50, a half of 100 that is an assumed full charge level.

In view of such a mode of use, not a negative electrode material showing an almost constant potential level over a capacity change under use like the conventional negative electrode material for small-size portable appliances, but rather a negative electrode material showing a large potential change over a capacity change under use may exhibit an improved input characteristic. For a specific example, it is preferred to select a non-graphitizable carbon or a graphitizable carbon showing a large potential change in response to capacity change for the negative electrode. The use of a non-graphitizable carbon is further preferred in view of a high durability.

Referring to FIG. 1, in the case of using LiCoO$_2$ for positive electrode and graphite for negative electrode, an upper limit voltage is 4.1 V, a lower limit voltage is 3.0 V and a voltage at a half charge capacity (i.e., a half of full charge capacity) is ca. 3.8 V so that ΔV at the time of charging is 0.3 V and ΔV at the time of discharging is 0.8 V. On the other band, in the case of using LiMn$_2$O$_4$ for positive electrode and non-graphitizable carbon for negative electrode, the upper limit voltage becomes 4.2 V and the lower limit voltage becomes 2.5 V to provide a larger difference between the upper and lower limit voltages than in the former case. (Particularly, if a graphite negative electrode is use at an upper limit voltage of 4.2 V, the deposition of lithium metal on the negative electrode surface and the deposition of electrolytic solution contacting the electrode are liable to occur.) Further, the voltage at a half of full charge capacity level becomes ca. 3.4 V-3.7 V depending on the battery designing, and if the voltage is set to 3.5 V, ΔV on charging becomes 0.7 V and ΔV on discharging becomes 1.0 V so that a larger ΔV can be attained particularly in the discharging, thus making it possible to achieve a remarkable improvement in the objective input characteristic. Further, while the potential does not substantially change in response to capacity change in the case of using graphite for negative electrode, a large potential change occurs in response to capacity change in the case of using non-graphitizable carbon or graphitizable carbon, thus giving an advantage that the remaining capacity of the battery can easily estimated from the terminal voltage.

As described above, non-graphitizable carbon has excellent input/output characteristics suited as a negative electrode material for high input/output current non-aqueous electrolyte secondary batteries. Further, non-graphitizable carbon is believed to be able to comply with (2) durability under high temperatures and (3) price competitiveness that are other requirements of the negative electrode material for high input/output current non-aqueous electrolyte secondary batteries.

Figure 2:
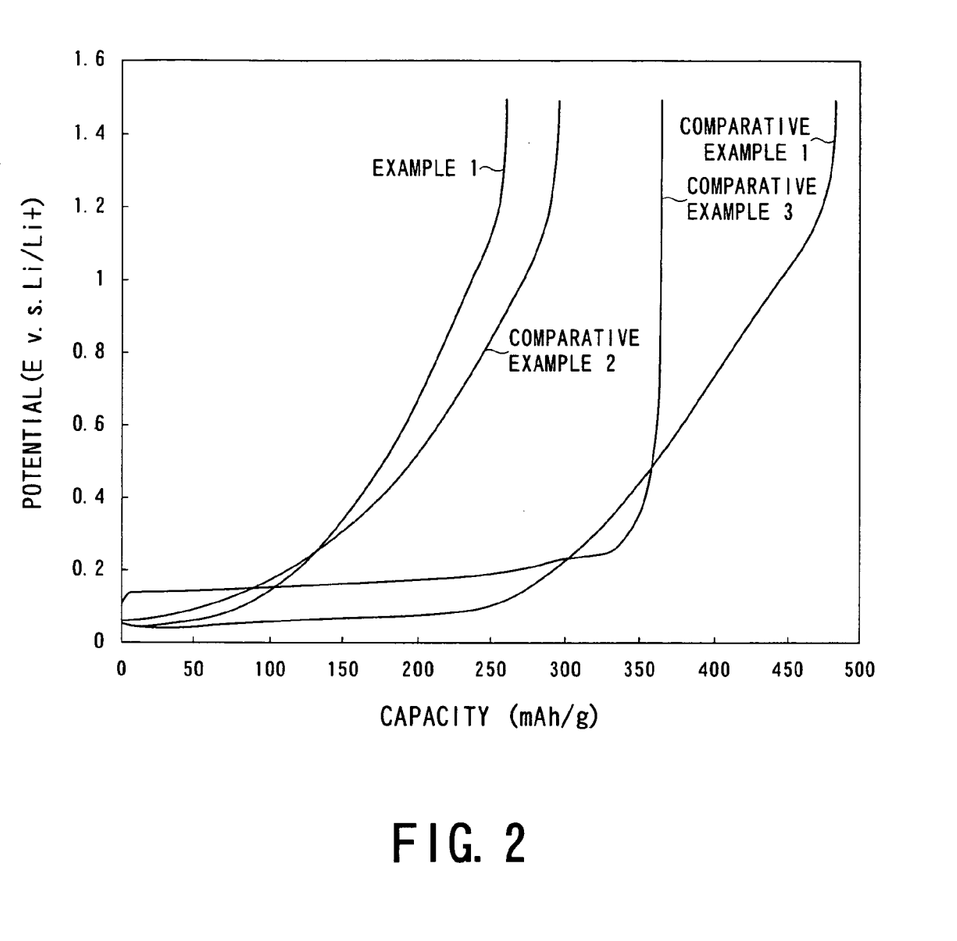
FIG. 2 shows capacity (electricity)-battery voltage curves at the time of discharging of various negative electrode materials evaluated with a lithium counter electrode.

However, non-graphitizable carbon hitherto developed as a negative electrode material for small-size portable appliances has a remarkable large capacity in a region of small potential change in proximity to its full charge level and is liable to exhibit only a small capacity change in response to potential change in a region of large potential change as well as a capacity change which is thought much of when used in HEV (see FIG. 1). According to the present inventors' study, such input/output characteristics of a negative electrode material are best demonstrated in a capacity (electricity)-battery voltage curve at the time of discharging evaluated together with a lithium counter electrode not affected by the characteristics of counter electrode materials (an example thereof being shown as FIG. 2). In FIG. 2, such a curve for a conventional non-graphitizable carbon is denoted as "COMPARATIVE EXAMPLE 1" (a characteristic curve for a non-graphitizable carbon obtained in Comparative Example 1 described hereinafter). Thus, such a non-graphitizable carbon negative electrode material exhibits a large capacity in a region proximate to a battery voltage of 0 V (corresponding to a proximity to a full charge region).

In contrast thereto, the present inventors have succeeded in production of a non-graphitizable carbon that has a suppressed capacity at a voltage proximate to 0 V, principally comprises a capacity (A) in a battery voltage region of 0.3-1.0 V and is therefore extremely suitable as a negative electrode material for high input/output current non-aqueous electrolyte secondary battery as used in HEV, by adopting an inert gas atmosphere with an extremely suppressed inert gas amount in calcining a carbon precursor comprising a crosslinked porous pitch, etc., and thus arriving at the present invention.

Thus, the process for producing a negative electrode material for a non-aqueous electrolyte secondary battery according the present invention is characterized by heat-treating a crosslinked carbon precursor at a temperature of at least 1000° C. in an inert gas atmosphere with a reduced amount of inert gas represented by a supply amount thereof of at most 600 ml per gram of the carbon precursor. The thus-produced negative electrode material of the present invention is also has a characteristic that it exhibits a remarkably small lowering in efficiency in terms of discharge capacity/charge capacity even after standing in atmospheric air.

BEST MODE FOR PRACTICING THE INVENTION

The negative electrode material for high input/output current non-aqueous electrolyte secondary batteries according the present invention is characterized by an average (002) interlayer spacing $d_{002}$ of 0.355-0.400 nm as measured by x-ray diffractometry and a true density of 1.50-1.60 g/cm³ and is basically classified as a non-graphitizable carbon. A smaller average interlayer spacing represents a crystal structure which is a characteristic of graphitizable carbon having a turbostratic texture or a graphitic material obtained by treatment thereof at high temperatures. Such a graphitizable carbon material having a turbostratic texture or a graphitic material is inferior in the above-mentioned input/output characteristics, particularly input characteristics, as a negative electrode material for non-aqueous electrolyte secondary batteries and moreover causes expansion and constriction at the time of doping and dedoping reactions of lithium, thus being not preferred in view of problems in durability. Too large an average interlayer spacing represents an insufficient degree of carbonization and causes a non-favorable increase of irreversible capacity which is a value obtained by subtracting a dedoping capacity from a doping capacity, respectively, of lithium. The average interlayer spacing $d_{002}$ is preferably 0.360-0.390 nm, further preferably 0.370-0.380 nm. As for the crystalline texture of carbon materials, it is difficult to differentiate a graphitizable carbon and a non-graphitizable carbon only by such an average interlayer spacing.

The negative electrode material of the present invention has a true density in the range of 1.50-1.60 g/cm³, which defines a non-graphitizable carbon in combination with the above-specified $d_{002}$.

A hydrogen-to-carbon atomic ratio (H/C) as measured by elementary analysis provides a good index of carbonization degree of a carbon material. A lower carbonization degree is accompanied with an increase of undesirable irreversible capacity due to abundant presence of functional groups reacting with lithium. The hydrogen-to-carbon atomic ratio (H/C) is preferably at most 0.1, further preferably at most 0.05.

In order to improve the output characteristic, it is important to make thinner the active substance layer in the electrode, and for this purpose, a smaller average particle size is important. However, too small an average particle size leads to an undesirably increased amount of fine powder, which adversely affects the safety. Further, too small a particle size requires a larger amount of binder, which results in an undesirable increase of electrode resistance. On the other hand, a larger average particle size results in an undesirable increase in diffusion free path of lithium, by which quick charge-discharge becomes difficult. The average particle size in terms of $Dv_{50}$ (i.e., a particle size giving a cumulative volume of 50%) is preferably 2-30 μm, further preferably 4-20 μm, particularly preferably 5-15 μm.

In order to improve the output characteristic, it is important to make thinner the active substance layer in the electrode, and for this purpose, a smaller maximum particle size is important. The maximum particle size is preferably at most 80 μm, further preferably at most 50 μm. A smaller maximum particle size leads to a smaller average particle size.

In order to suppress the decomposition of an electrolyte solution, it is preferred to provide a smaller specific surface area. A preferred range of specific surface area is 0.5-15 m²/g, particularly 1.0-5.0 m²/g.

A characteristic of the negative electrode material of the present invention is that it has a large diffusion coefficient and exhibits good ability to dope and dedoped lithium ions. It is preferred to show a lithium diffusion coefficient of at least $10^{-7}$ cm²/S over an entire region of battery voltage range of 0.3-1.0 V. This cannot be satisfied by a graphitizable carbon (of which the diffusion constant decreases down to ca. 0.5× $10^{-7}$ cm²/s around 0.3 V). Empirically speaking, a graphitic negative electrode material exhibits considerably inferior ability to dope and dedoped lithium ions, but the measurement of diffusion coefficient for a graphitic negative electrode material which causes a stepwise phase structure change in packing of lithium is impossible in principle.

Another characteristic of the negative electrode material of the present invention is that it is stable against oxidation in atmospheric air as represented by an extremely small lowering of at most 2% in efficiency in terms of discharge capacity/charge capacity when left standing for 1 month in atmospheric air.

The negative electrode material of the present invention is preferably produced though a process similar to the conventional process for producing a pitch-based carbon negative electrode material for non-aqueous electrolyte secondary batteries except for changing the method of controlling the environment for calcination. More specifically, it is produced, for example, through a process as described below.

That is, a process of crosslinking tar or pitch of petroleum- or coal-origin to form a crosslinked carbon precursor and carbonizing the carbon precursor in an inert gas atmosphere with a suppressed amount of inert gas represented by a supply amount thereof of at most 600 ml per gram of the carbon precursor.

The crosslinking of tar or pitch is performed in order to render non-graphitizable a carbonaceous material obtained by carbonizing the crosslinked tar or pitch.

As the tar or pitch, it is possible to use a tar or pitch of a petroleum or coal origin, examples of which may include a petroleum type tar or pitch by-produced in ethylene production, coal tar produced by dry distillation of coal, heavy fraction or pitch obtained from coal tar by removing low-boiling fractions by distillation, and tar or pitch obtained by liquefaction of coal. These tars or pitches can be used in mixture of two or more species.

The crosslinking methods may include a method of using a crosslinking agent, and a method of treatment with an oxidizing agent such as air. In the case of using a crosslinking agent, the crosslinking agent is added to and heated in mixture with the tar or pitch of petroleum or coal origin to proceed with the crosslinking reaction, thereby producing a carbon precursor.

As the crosslinking agent, it is possible to use, e.g., a poly-functional vinyl monomer, such as divinylbenzene, trivinylbenzene, diallyl phthalate, ethylene glycol dimethacrylate, or N,N-methylene-bis-acrylamide. The crosslinking reaction with a poly-functional vinyl monomer is initiated by adding a radical initiator. As the radical initiator, it is possible to use, e.g., $\alpha,\alpha'$-azobisisobutyronitrile (AIBN), benzoyl peroxide (BPO), lauroyl peroxide, cumene hydroperoxide, dicumyl peroxide, or t-butyl hydroperoxide.

Further, in the case of proceeding with the crosslinking reaction by treatment with an oxidizing agent such as air, it is preferred to obtain a carbon precursor through a process as described below.

A pitch, such as petroleum pitch or coal pitch, is mixed under heating with an additive comprising an aromatic compound having a boiling point of at least 200° C. and having generally two to three rings or a mixture of such aromatic compounds to form a shaped pitch product. Then, the additive is removed from the pitch product by extraction with a solvent having a low dissolving power for the pitch and a high dissolving power for the additive to form a porous pitch, which is then oxidized to form a carbon precursor.

The above-mentioned aromatic additive is added for the purpose of converting the shaped pitch product into a porous material through removal by extraction of the additive so as to facilitate the micro-structure control by oxidation and calcination of the carbonaceous material in the subsequent steps. Such an additive may more specifically be selected as a single species or a mixture of two or more species selected from, e.g., naphthalene, methylnaphthalene, phenylnaphthalene, benzylnaphthalene, methyl-anthracene, phenanthrene, and biphenyl. The additive may preferably be added in a proportion of 30-70 wt. parts per 100 wt. parts of the pitch.

The mixing of the pitch and the additive may suitably be performed in a molten state under heating in order to achieve uniform mixing. The resultant mixture of the pitch and additive may preferably be shaped into particles of at most 1 mm in diameter so as to facilitate the extraction of the additive from the mixture. The shaping may be performed in a molten state or by pulverization of the mixture after cooling.

Suitable examples of the solvent for removal by extraction of the additive from the mixture of the pitch and the additive may include: aliphatic hydrocarbons, such as butane, pentane, hexane and heptane; mixtures principally comprising aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that holes are formed at parts from which the additive is removed, thereby providing a uniformly porous pitch product.

The thus-obtained porous pitch product is then subjected to an infusibilization treatment, i.e., an oxidation treatment at a temperature of from room temperature to 400° C. by using an oxidizing agent, thereby to form a thermally infusible porous pitch product. Examples of the oxidizing agent may include: oxidizing gases, such as $O_2$, $O_3$, $SO_3$, $NO_2$, $Cl_2$, mixture gases formed by diluting these gases with, e.g., air or nitrogen, and air; and oxidizing liquids, such as sulfuric acid, phosphoric acid, nitric acid, chromic acid salt aqueous solution, permanganic acid salt solution, and hydrogen peroxide aqueous solution.

It is convenient and also economically advantageous to effect the crosslinking by oxidation at 120-300° C. while using an oxide-containing gas, such as air or a mixture of air with another gas such as combustion gas, as the oxidizing agent. In this case, it is preferred to use a pitch having a softening point of at least 150° C. since a low-softening point pitch is liable to be melted during the oxidation, thus rendering the oxidation difficult.

The carbon precursor subjected to crosslinking in the above-described manner is calcined at 1000-2000° C., preferably 1100-1600° C., in an inert gas atmosphere with a reduced amount of inert gas at a supply rate of at most 600 ml per 1 g of the carbon precursor, to obtain a negative electrode material of the present invention. The calcination may commercially be performed, e.g., by placing a pulverizate of the carbon precursor in a thin layer of ca. 5 mm or less in a horizontal calcination furnace and flowing an inert gas, such as nitrogen or argon, at a small rate of at most 600 ml/g (e.g., a rate of at most 10 ml/g·min in case where the calcination period is 1 hour), preferably at most 400 ml/g, further preferably at most 300 ml/g, with respect to the carbon precursor, but may also be performed in a closed atmosphere as, e.g., in a crucible, in a small-scale production. Anyway, the inert gas flow rate of at most 600 ml/g is far more suppressed rate than 60000 ml/g adopted in Production Examples in the above-mentioned Patent document 5 for production of a negative electrode material for small-sized portable machines.

The negative electrode material of the present invention obtained in the above-described manner may, for example, be used for production of electrodes, as it is or together with an electroconductive aid comprising, e.g., electroconductive carbon black, such as acetylene black or furnace black in an amount of 1-10 wt. % thereof, in combination with a binder and an appropriate amount of solvent added thereto, followed by kneading to form a pasty electrode-forming composition, which is then applied onto an electroconductive substrate comprising, e.g., a circular or rectangular metal plate, dried and press-formed into a 10 to 200 μm-thick layer. The binder is not particularly restricted if it is not reactable with an electrolytic solution and may comprise polyvinylidene fluoride, polytetrafluorethylene, styrene butadiene rubber (SBR), etc. In the case of polyvinylidene fluoride, a solution thereof in a polar solvent, such as N-methylpyrolidone (NMP), may preferably be used, whereas it is also possible to use an aqueous emulsion of SBR, etc. The binder may preferably be added in an amount of 0.5-10 wt. parts per 100 wt. parts of the negative electrode material according to the present invention. Too large an addition amount of the binder is not preferred because it results in an increase in electrical resistance of the resultant electrode leading to an increased inner resistance of the battery and lower battery performances. On the other hand, too small an addition amount of the binder results in insufficient bonding of the negative electrode material particles with each other and with the electroconductive substrate. The negative electrode material of the present invention may preferably be used as an active substance of a negative electrode of a high input/output current non-aqueous electrolyte secondary battery for HEV, etc., particularly as a negative electrode active substance for a lithium secondary battery, by taking advantage of excellent high input/output performances thereof. The coating amount of the active substance is preferably as small as possible, so as to provide a large output, and may preferably be at most 60 g/m$^2$, further preferably 50 g/m$^2$ or less.

In the case of forming a negative electrode of a non-aqueous electrolyte secondary battery using the negative electrode material of the present invention, other components of the battery, such as a positive electrode material, a separator and an electrolytic solution, are not particularly restricted, and various materials conventionally used in or proposed to be used for non-aqueous electrolyte secondary batteries can be used.

For example, the positive electrode material may preferably comprise a complex metal chalcogenide, such as $LiCoO_2$, $LiNiO_2$, $LiMnO_2$, or $LiMn_2O_4$, and may be formed together with an appropriate binder and an electroconductivity-imparting carbon material into a layer on an electroconductive substrate.

A non-aqueous solvent-type electrolytic solution used in combination with such a positive electrode and a negative electrode may generally be formed by dissolving an electrolyte in a non-aqueous solvent, it is possible to use one or two or more species in combination of organic solvents, such as propylene carbonate, ethylene carbonate, dimethyl carbonate, diethyl carbonate, dimethoxyethane, diethoxyethane, γ-butyrolactone, tetrahydrofuran, 2-methyl-tetrhydrofuran, sulfolane and 1,3-dioxolane. On the other hand, as the electrolyte, it is possible to use $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$, etc. A secondary battery may generally be formed by oppositely disposing a positive electrode layer and a negative electrode layer prepared in the above-described manner optionally by the medium of a liquid-permeating separator comprising non-woven cloth, another porous material, etc., and immersing them in an electrolytic solution.

It is also possible to use a solid electrolyte comprising a polymer gel impregnated with an electrolytic solution instead of such a separator.

EXAMPLES

Hereinbelow, the present invention will be described more specifically with reference to Examples. Physical property values described in the specification including the following Examples are based on values obtained according to the following method.

[Evaluation Test Items]

(XRD Measurement)

<$d_{002}$ of a Carbon Material>

A powdery sample of a carbon material was packed in a sample holder and irradiated with monochromatic $CuK_\alpha$ ray through a graphite monochrometer to obtain an X-ray diffraction pattern. The peak position of the diffraction pattern was determined by the center of gravity method (i.e., a method wherein the position of gravity center of diffraction lines is obtained to determine a peak position as a 2θ-value corresponding to the gravity center) and calibrated by the diffraction peak of (111) plane of high-purity silicon powder as the standard substance. The $d_{002}$ value was calculated by the Bragg's formula with the wavelength of $CuK_\alpha$ ray as 0.15418 nm.

$d_{002}=\lambda/(2\cdot\sin\theta)$ (Bragg's formula)

(Specific Surface Area Measurement)

<Specific Surface Area by Nitrogen Adsorption>

An approximate equation: $V_m=1/(v-(1-x))$ derived from the BET equation was used to obtain $V_m$ at the liquid nitrogen temperature according to the BET single point method (at a relative pressure x(=0.3)) using nitrogen adsorption, and a specific surface area of the sample was calculated based on the following equation:

Specific surface area=$4.35\times V_m(m^2/g)$, wherein $V_m$ denotes an amount of adsorption ($cm^3/g$) required to form a mono-molecular layer, v denotes an actually measured amount of adsorption ($cm^3/g$), and x denotes a relative pressure.

More specifically, an amount of adsorbed nitrogen on a carbon material at the liquid nitrogen temperature was measured in the following manner by using "Flow Sorb II 2300" made by Micromeritics Instrument Corp.

A sample carbon material pulverized to a particle diameter of 9-24 μm was packed in a sample tube, and the sample tube was cooled to −196° C. while flowing helium gas containing nitrogen at a concentration of 20 mol %, thereby to cause the carbon material to adsorb nitrogen. Then, the sample tube was restored to room temperature to measure the amount of nitrogen desorbed from the sample by a thermal conductivity-type detector, thereby to obtain the adsorbed amount of the gas v.

[True Density Measurement]

A true density ($\rho_B$) was measured at 30° C. according to a method prescribed in JIS R7211 by using butanol as a substitution medium.

Examples and Comparative Examples of preparation of various carbonaceous materials are described below. The gas flow rates described below are values in the standard state (0° C., 1 atm.)

Comparative Example 1

70 kg of a petroleum pitch having a softening point of 205° C. and an H/C atomic ratio of 0.65, and 30 kg of naphthalene, were placed in a 300 liter-pressure-resistant vessel equipped with stirring blades and an outlet nozzle, melt-mixed under heating at 190° C. and, after being cooled to 80-90° C., extruded from the outlet nozzle by pressurizing the inside of the pressure-resistant vessel with nitrogen gas to form a ca. 500 μm dia.-string-shaped product. Then, the string-shaped product was broken so as to provide a diameter-to-length ratio of ca. 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with ca 6 times by weight of n-hexane to remove the naphthalene in the pitch spheres. The thus-obtained porous spherical pitch was heated to 270° C. in a fluidized bed while passing heated air and held at 270° C. for 1 hour to be oxidized into a thermally-infusible porous spherical pitch product. The pitch product was then further heated to 600° C. and held at 600° C. for 1 hour for preliminary carbonization to obtain a carbon precursor having a volatile matter content of at most 2%. The thus-obtained carbon precursor was pulverized to form a powder carbon precursor having an average particle size of ca. 10 μm.

Then, 10 g of the powdery carbon precursor was laid on an alumina sheet so as to form a 2 mm-thick layer, placed in a 100 mm-dia. horizontal tubular furnace, and carbonized by heating to 1200° C. at a rate of 250° C./hour and holding at 1200° C. for 1 hour while flowing nitrogen gas at a rate of 10 liters/min.

The properties of the thus-obtained carbonaceous material are inclusively shown in Table 1 appearing hereinafter together with those of Examples and Comparative Examples described below.

Example 1

A carbonaceous material was produced in the same manner as in Comparative Example 1 except that the nitrogen flow rate at the time of carbonization was changed to 1 ml/min.

Example 2

30 g of the powdery carbon precursor obtained in Comparative Example 1 was placed in a cylindrical crucible comprising a sample accommodating part measuring 40 mm in diameter and 60 mm in height, and the inlet thereof was sealed by a carbon sheet so as to effect carbonization while having generated gas during the carbonization remain in the crucible. The crucible was then placed in an electric furnace; and the interior of the system was evacuated under vacuum and replaced with nitrogen. Then, the interior of the electric furnace was rendered in a nitrogen gas atmosphere and heated to 1200° C. at a rate of 250° C./hour, followed by holding at 1200° C. for 1 hour, to produce a carbonaceous material.

Example 3

A carbonaceous materiel was produced in the same manner as in Example 2 except that the holding temperature for carbonization of the powdery carbon precursor was changed to 1300° C.

Example 4

A carbonaceous materiel was produced in the same manner as in Example 2 except that the holding temperature for carbonization of the powdery carbon precursor was changed to 1500° C.

Example 5

A carbonaceous materiel was produced in the same manner as in Example 2 except that the holding temperature for carbonization of the powdery carbon precursor was changed to 1900° C.

Comparative Example 2

Oil coke containing 3% of sulfur was pulverized to form a powdery carbon precursor having an average particle size of ca. 10 μm. Then, 10 g of the powdery carbon precursor was laid on an alumina sheet so as to form a 2 mm-thick layer, placed in a 100 mm-dia. horizontal tubular furnace, and carbonized by heating to 1200° C. at a rate of 250° C./hour and holding at 1200° C. for 1 hour while flowing nitrogen gas at a rate of 10 liters/min., to obtain a graphitizable carbon material.

Comparative Example 3

10 g of natural graphite (average particle size=24 μm) produced in China was laid on an alumina sheet so as to form a 2 mm-thick layer, placed in a 100 mm-dia. horizontal tubular furnace, and carbonized by heating to 1200° C. at rate of 250° C./hour and holing at 1200° C. for 1 hour while flowing nitrogen gas at a rate of 10 liters/min.

The properties of the carbon materials produced in the above-described respective Examples are inclusively shown in Table 1 described later.

Figure 3:
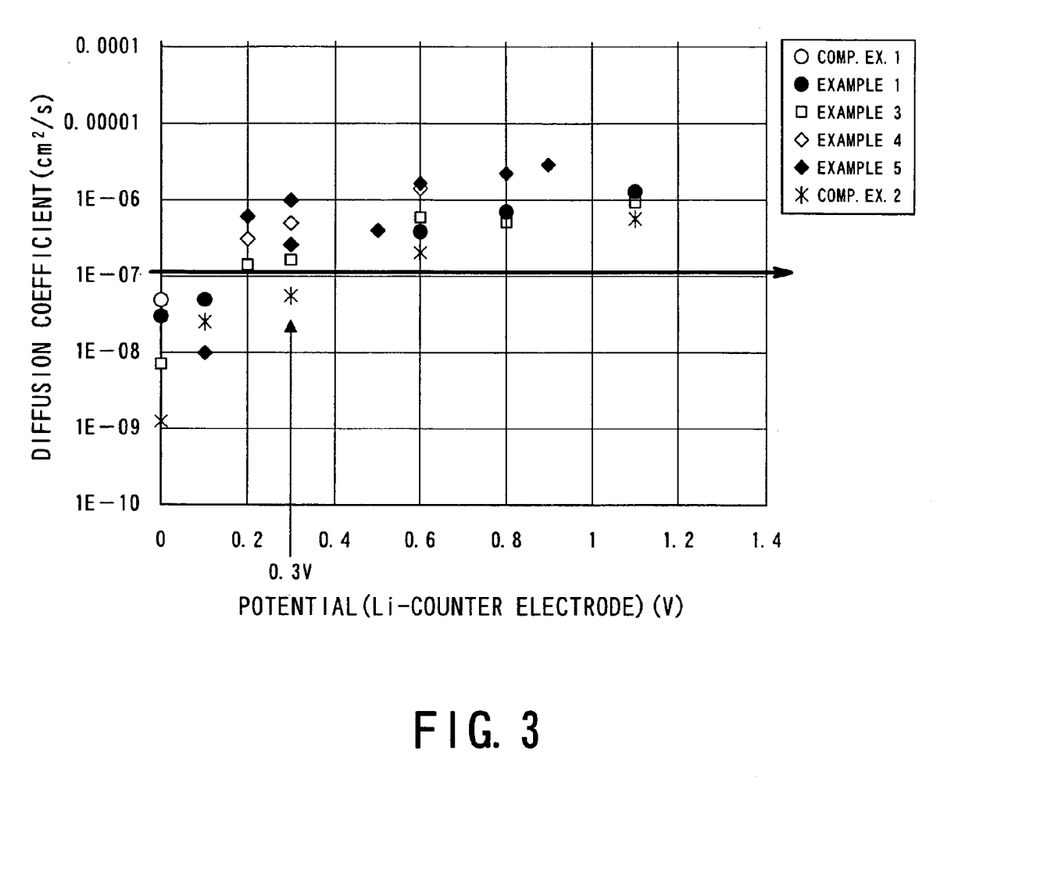
FIG. 3 shows data plots of Li diffusion coefficients measured with respect to negative electrode materials obtained in Examples and Comparative Examples.

The carbon materials produced in the respective Examples were subjected to the following evaluation of performances. The results of major performance evaluation are inclusively shown in Table 2 described later and the results of diffusion coefficient measurement are shown in FIG. 3, respectively.

(Preparation of Measurement Cell; Measurement of Diffusion Coefficient; Measurement of AC Impedance)

Each of the carbon materials prepared in the above Examples and Comparative Examples was used to prepare a non-aqueous electrolyte secondary battery. The carbon material of the present invention is generally suited for constituting a negative electrode of a non-aqueous electrolyte secondary battery but each carbon material was evaluated together with a lithium counter electrode so as to accurately evaluate the charge capacity, discharge capacity and non-discharge capacity of cell active substance representing the effect of the present invention without being affected by a fluctuation in performances of the counter electrode. More specifically, a lithium secondary battery was formed by using a lithium electrode showing stable properties as the negative electrode and the above-prepared carbon material as the positive electrode, and the performance thereof were evaluated.

The positive electrode (carbon electrode) was prepared in the following manner. A carbon material prepared in each Example in an amount of 95 wt. parts and 5 wt. parts of polyvinylidene fluoride were formed into a paste together with N-methyl-2-pyrrolidone added thereto, and the paste was then evenly applied onto a copper foil and dried at 130° C. for 30 min. in an inert atmosphere. The sheet-form electrode was stamped into a 15 mm-dia. disk which was then pressed to provide an electrode. The amount of the carbon material in the electrode was adjusted to ca. 20 mg, and the pressing was performed so as to provide a packing rate of carbon material of ca. 67%. The preparation of a lithium electrode was performed in a glove box of an Ar atmosphere. A 17 mm-dia. disk-shaped net of stainless steel was spot-welded in advance to an outer lid of a 2016-size coin-shaped cell can, and a 0.5 mm-thick thin plate of lithium metal stamped into a 15 mm-dia. disk was press-bonded onto the disk of stainless steel net to provide a negative electrode.

The thus-prepared positive and negative electrodes were used together with an electrolyte liquid comprising a mixture solvent of ethylene carbonate, dimethyl carbonate and ethyl methyl carbonate mixed in volume ratios of 3:4:4 and $LiPF_6$ added thereto at a rate of 1 mol/liter, and also a polypropylene-made porous membrane as a separator and a polyethylene-made gasket, thereby to assemble a 2016-size coin-shaped non-aqueous electrolyte lithium secondary battery in an Ar-glove box.

A lithium secondary battery of the above-described structure was subjected to doping and de-doping of lithium, and the capacities at that time were measured. The doping was performed by a constant current-constant voltage method. More specifically, constant current charging was performed at a current density of 0.5 mA/cm$^2$ up to 0 V, and on reaching 0 V, the current value was decreased at the constant voltage until 20 μA as the charging termination point. The electricity supplied at this time was divided by the weight of the carbon material used to determine a charge capacity in the unit of mAh/g. Then, a current is passed similarly in a reverse direction to de-dope the doped lithium. The de-doping was performed at a current density of 0.5 mA until a terminal voltage of 1.5 V as the cut-off voltage. The electricity discharged at that time was determined as discharge capacity in the unit of mAh/g. Then, an irreversible capacity was determined as a difference between the charge capacity and the discharge capacity. The discharge capacity was divided by the charge capacity and multiplied by 100 to obtain a discharge efficiency (%). This is a value representing a rate of effective utilization of the active substance. The performance evaluation was performed at 25° C.

(Standing Characteristic)

Powdery carbon material in a layer thickness of 3 mm was left standing in an air atmosphere held at a humidity of 15% and room temperature. After the standing, the carbon material was used to form a battery (cell) in the same manner as above for evaluation of the cell performances.

(Measurement of Diffusion Coefficient)

Li ion diffusion coefficient was determined through an AC (alternating current) impedance measurement.

<Preparation of a Test Cell for AC Impedance Measurement>

A test cell for AC impedance measurement was prepared in the following manner. A battery (cell) after being subjected to the charging and discharging in the above-described manner was again subjected to constant-current charging at a current density of 0.5 mA/cm$^2$ up to a prescribed potential, and on reaching the prescribed potential, the current was decreased at a constant voltage until 20 μA as the charging termination point. The cell charged to the prescribed potential was left standing for 24 hours and then subjected to AC impedance measurement.

<Details of AC Impedance Measurement>

The AC impedance method is a method of polarizing an electrode-electrolytic solution boundary with minute AC voltages having different frequencies to cause a current change and measuring an impedance at the electrode boundary from the current change to separate and quantitatively analyze the electrode reaction. According to the AC impedance method, it is possible to separate an elementary step of electrochemical reaction and quantitatively determine a diffusion constant, a charge migration resistance, etc. Parameters are derived from the shape of Nyquist's plots obtained by plotting real parts and imaginary parts of impedances on an X-axis and a Y-axis, respectively, and substituted into a theoretical formula to assume the rate-determining step.

As the test machine for AC impedance measurement, a potentio/galvanostat (SI1286) and a frequency response analyzer (FRA, SI1260) available from TOYO Technica K.K. (Solatron Co.) were used. The measurement was performed by setting a cell in a thermostat vessel since the measurement results are affected by temperatures. A cell charged to a prescribed potential was left standing for 24 hours and then the AC impedance measurement was performed. The measurement conditions are shown below.

Superposed AC voltage: 5 mV,
Frequency range: 10 kHz-0.1 mHz
Measurement temperature: 25° C.

<Derivation of Diffusion Constant>

The calculation of diffusion constants was performed in the following manner based on formulae shown by HO, et al (Journal of Electro Chemical Soc., Vol. 127, p. 343 (1980)).

On a Nyquist's plot, impedance (Zw) can be expressed according to formula (1) for a linear region of 45 deg. appearing in a low frequency region. The Warburg's element Aw in the formula can be expressed according to formula (2). From the formulae (1) and (2), a diffusion constant D is expressed according to formula (3). Values of impedance Zw and frequency ω at a point of shift from the linear region of 45 deg. to a larger slope (i.e., a point of shift from an infinite diffusion region to a definite diffusion region) were substituted into the formula (3) to derive a diffusion coefficient.

$$Z_w = A_w \omega^{-1/2} \tag{1}$$

$$Aw = Vm(dE/dX)/Z_fFAD^{1/2} \tag{2}$$

$$D = Vm^2(dE/dX)^2/(Z_fFA)^2 \times \omega^{-1} \times (2^{1/2}Zw)^{-2} \tag{3}$$

wherein AW denotes Warburg's element,
Vm: molar volume,
A: area (an electrode area of 1.767 cm² determined by an area of contact between the positive electrode and negative electrode of a coin cell in the measurement at this time.)
dE/dX: a potential change corresponding to an electricity change.
F: Faraday constant (=96485 C/mol)
Zi: atomic valence of Li (=1)
D: diffusion constant (cm²/sec)
ω: angular frequency (=2πf, f: frequency/Hz)

(High-Temperature Cycle Durability)

A discharge capacity after 100 cycles at 45° C. in a cell obtained by combination with an LiCoO₂ positive electrode relative to a discharge capacity in the first cycle was determined as a %-capacity maintenance rate. Details thereof are as follows.

As the positive electrode material (active substance), LiCoO₂ ("CELLSEED C5-H", made by Nippon Kagaku Kogyo K.K.) was used, and 94 wt. parts, 3 wt. parts of acetylene black and 3 wt. parts of polyvinylidene fluoride (binder) were mixed together with N-methyl-2-pyrrolidone (NMP) to form a paste, which was then evenly applied onto both surfaces of a 20 μm-thick aluminum foil strip. After drying at 130° C. for 30 min., the resultant sheet electrode was stamped into a 14 mm-dia. disk and pressed to provide an electrode.

For the negative electrode (carbon electrode), a carbon material prepared in each of the above Examples and Comparative Examples in an amount of 95 wt. parts and 5 wt. parts of polyvinylidene were formed into a paste together with N-methyl-2-pyrrolidore added thereto, and the paste was then evenly applied onto a copper foil and dried at 130° C. for 30 min. in an inert atmosphere. The sheet-form electrode was stamped into a 15 mm-dia. disk, which was then pressed to provide an electrode. The amount of the carbon material in the electrode was adjusted to ca. 20 mg, and the pressing was performed so as to provide a packing rate of carbon material of ca. 67%.

The thus-prepared positive and negative electrodes were used together with an electrolyte liquid comprising a mixture solvent of ethylene carbonate, dimethyl carbonate and ethyl methyl carbonate mixed in volume ratios of 3:4:4 and LiPF₆ added thereto at a rate of 1 mol/liter, and also a polypropylene-made porous membrane as a separator and a polyethylene-made gasket, thereby to assemble a 2016-size coin-shaped non-aqueous electrolyte lithium secondary battery in an Ar-glove box. A charge-discharge test was performed by using a lithium secondary battery thus prepared.

The charging was performed by a constant current-constant voltage method. More specifically, the charging conditions were set to a charging upper limit voltage of 4.2 V and a charging current value of 1 C (i.e., a current value required for charging in 1 hour), and on reaching 4.2 V, the current was decreased while keeping the constant voltage until the current reached C/100 where the charging was terminated. Then, a current was passed in a reverse direction for discharging. The discharging was continued at a current of 1 C and terminated on reaching 2.5 V. The charging and discharging were repeated in a thermostat vessel at 45° C. to evaluate the high-temperature cycle performance.

In the above-described cycle performance evaluation test, a discharge capacity after 100 cycles was divided by a discharge capacity in the first cycle to determine a capacity retention rate (%).

TABLE 1

| Example | Carbon material | Calcination condition | Degree of infusibilization % | Nitrogen flow rate ml/g | Calcination temp. ° C. | Average particle size μm | Specific surface area m²/g | True density g/cm³ | $d_{002}$ nm |
|---|---|---|---|---|---|---|---|---|---|
| Comp. 1 | Non-graphitizable carbon | Horizontal furnace (open) | 17 | $6 \times 10^4$ | 1200 | 10 | 7.0 | 1.51 | 0.374 |
| 1 | Non-graphitizable carbon | Horizontal furnace (open) | 17 | 60 | 1200 | 10 | 3.2 | 1.52 | 0.378 |
| 2 | Non-graphitizable carbon | Crucible (closed) | 17 | <6 | 1200 | 10 | 2.7 | 1.52 | 0.379 |
| 3 | Non-graphitizable carbon | Crucible (closed) | 17 | <6 | 1300 | 10 | 2.5 | 1.53 | 0.373 |
| 4 | Non-graphitizable carbon | Crucible (closed) | 17 | <6 | 1500 | 10 | 2.4 | 1.55 | 0.372 |
| 5 | Non-graphitizable carbon | Crucible (closed) | 17 | <6 | 1900 | 10 | 2.4 | 1.55 | 0.358 |
| Comp. 2 | Graphitizable carbon | Horizontal furnace (open) | 1.5 | $6 \times 10^4$ | 1200 | 10 | 2.1 | 2.05 | 0.350 |
| Comp. 3 | Natural graphite | None | — | — | — | 24 | 4.2 | 2.26 | 0.335 |

TABLE 2

| Example | Initial stage performances | | | | | | High-temp. durability | Performances after standing in air *3 | |
|---|---|---|---|---|---|---|---|---|---|
| | Charge capacity mAh/g | Discharge capacity mAh/g | Irreversible capacity mAh/g | Efficiency % | Discharge capacity (mAh/g) 0.3-1.0 V | Discharge capacity ratio *1 | Capacity retention after 100 cycles *2 % | Irreversible capacity mAh/g | Efficiency % |
| Comp. 1 | 557 | 481 | 76 | 86.4 | 128 | 0.29 | 90 | 97 | 82.6 |
| 1 | 317 | 260 | 57 | 82.1 | 95 | 0.40 | 92 | 63 | 80.1 |
| 2 | 359 | 290 | 69 | 82.0 | 92 | 0.37 | 91 | 72 | 79.9 |
| 3 | 305 | 265 | 40 | 80.8 | 91 | 0.36 | 92 | 39 | 87.2 |
| 4 | 217 | 187 | 30 | 86.9 | 72 | 0.41 | 93 | 30 | 86.2 |
| 5 | 159 | 136 | 23 | 85.5 | 56 | 0.39 | 93 | 22 | 85.5 |
| Comp. 2 | 390 | 300 | 90 | 76.9 | 121 | 0.47 | 76 | — | — |
| Comp. 3 | 391 | 365 | 26 | 93.4 | 13 | 0.03 | — | — | — |

*1: Discharge capacity ratio = (capacity between 0.3-1.0 V)/(capacity between 0-1.0 V).
*2: Ratio with respect to the capacity in the first cycle.
*3: Performances after standing for 1 month in an environment of 22° C. and 15% RH.

In view of the performances shown in Table 2 in parallel with the properties shown in Table 1, the negative electrode carbon materials obtained through calcination in an inert gas atmosphere with a suppressed flow rate of the inert gas in Examples of the present invention exhibited a high discharge capacity in a range of 0.3-1.0 V and a high ratio thereof with respect to the discharge capacity in a range of 0-1.0 V, required of a negative electrode material for high input/output current non-aqueous electrolyte secondary batteries, and also excellent high-temperature cycle durability and performances after standing in air. Thus, they exhibit well-balanced performances as a negative electrode material for high input/output current non-aqueous electrolyte secondary batteries. In contrast thereto, a conventional non-graphitizable carbon negative electrode material (Comparative Example 1) obtained through calcination under the condition of a large gas flow rate exhibited an inferior discharge capacity ratio and a larger lowering in efficiency (86.4-82.6=3.8%) after standing in the atmospheric air. Further, graphitizable carbon (Comparative Example 2) exhibited a large irreversible capacity from the initial stage and also inferior high-temperature durability (Comparative Example 3). Further, graphite negative electrode material (Comparative Example 3) exhibited a small 0.3-1.0 V discharge capacity and also a small discharge capacity ratio.

The invention claimed is:

1. A negative electrode material for a high input/output current-type non-aqueous electrolyte secondary battery, comprising a carbon material having an average (002) interlayer spacing $d_{002}$ of 0.355-0.400 nm determined by X-ray diffractometry and a true density of 1.50-1.60 g/cm$^3$, and exhibiting a capacity (A) of at least 50 mAh/g in a battery voltage range of 0.3-1.0 V and a ratio ((A)/(B)) of at least 0.3 between the capacity (A) and a capacity (B) in a battery voltage range of 0-1.0 V when measured as discharge capacities with a counter electrode of lithium; the negative electrode material further showing a lowering of at most 2% in efficiency defined as discharge capacity/charge capacity after 1 month of standing in atmospheric air.

2. A negative electrode material according to claim 1, showing a lithium diffusion coefficient of $10^{-7}$ cm$^2$/sec or higher over a whole region of battery voltage range of 0.3-1.0 V when measured with a counter electrode of lithium.

3. A negative electrode material according to claim 1, having an average particle size of 2-30 μm and a maximum particle size of at most 80 μm.

4. A negative electrode material according to claim 1, having a specific surface area of 0.5-15 m$^2$/g.

5. A negative electrode material according to claim 1, wherein the ratio ((A)/(B)) between the capacity (A) and the capacity (B) is at least 0.36 and at most 0.41.

6. A process for producing a negative electrode material for a non-aqueous electrolyte secondary battery according to claim 1, comprising: heat-treating a crosslinked carbon precursor at a temperature of at least 1000° C. in an inert gas atmosphere with a reduced amount of inert gas represented by a supply amount thereof of at most 60 ml per gram of the carbon precursor.

7. A process according to claim 6, wherein the crosslinked carbon precursor comprises a crosslinked tar or pitch of petroleum or coal origin.

8. A non-aqueous electrolyte secondary battery having a negative electrode comprising a negative electrode material according to claim 1.

9. A hybrid vehicle, having a motor equipped with a non-aqueous electrolyte secondary battery according to claim 8 as a power supply for operating the motor and for recovering a regenerated energy, and also an internal combustion engine, as power sources.

* * * * *

UNITED STATES PATENT AND TRADEMARK OFFICE
CERTIFICATE OF CORRECTION

PATENT NO.         : 7,718,307 B2                                         Page 1 of 1
APPLICATION NO.    : 11/547645
DATED              : May 18, 2010
INVENTOR(S)        : Kazuhiko Shimizu et al.

It is certified that error appears in the above-identified patent and that said Letters Patent is hereby corrected as shown below:

On the Title Page

Item (75) Inventors, please change:

"Akiko Hoshi, Fukushima-Ken, (JP)"

to

--Akio Hoshi, Fukushima-Ken, (JP)--.

Signed and Sealed this

Sixteenth Day of November, 2010

David J. Kappos
*Director of the United States Patent and Trademark Office*